UNITED STATES PATENT OFFICE.

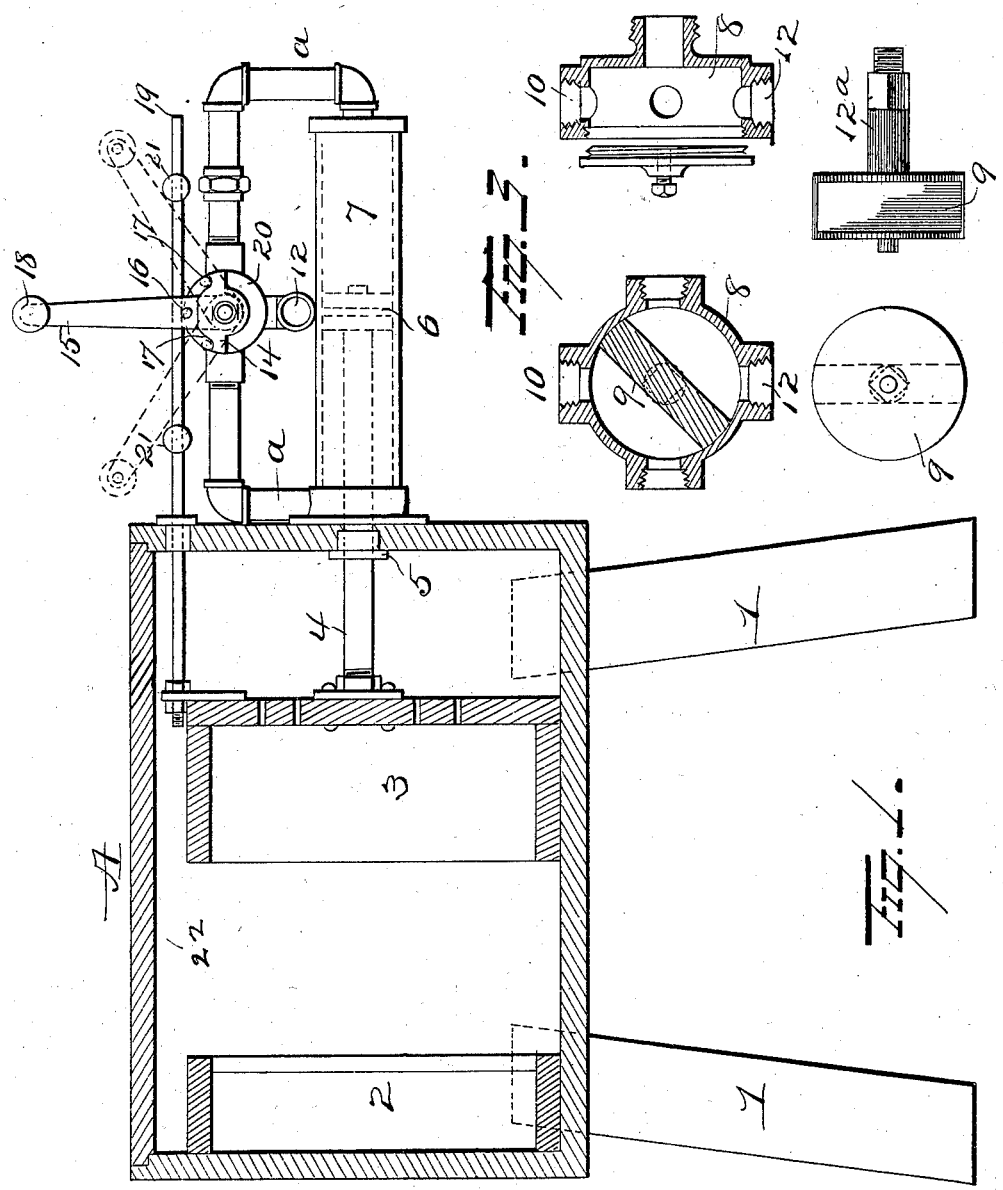

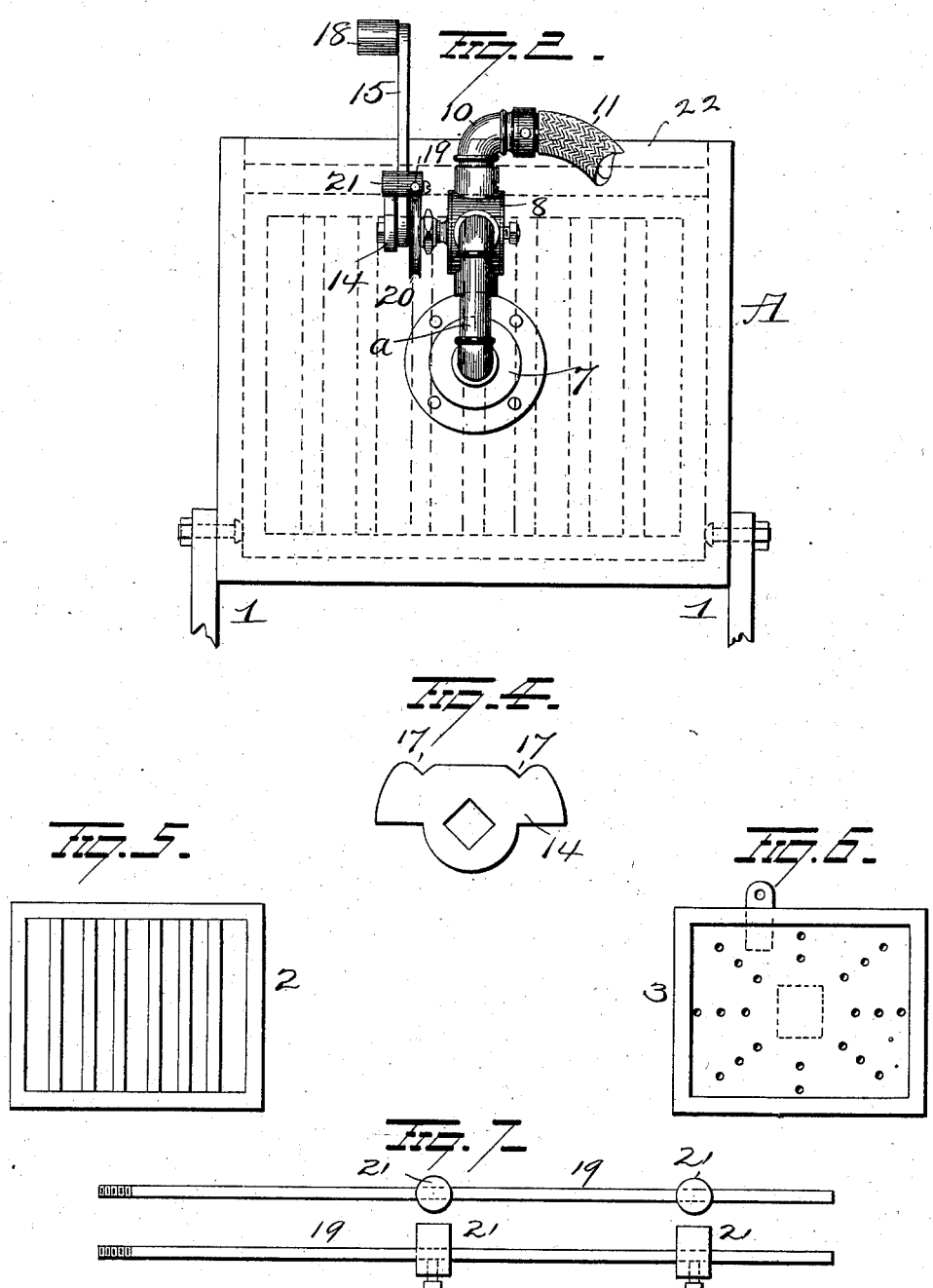

DAVID BOORMAN AND ALBERT P. SHARP, OF ALTOONA, PENNSYLVANIA; SAID SHARP ASSIGNOR TO WILLIAM H. GLENN AND JOHN H. WALTON, OF ALTOONA, PENNSYLVANIA.

WASHING-MACHINE.

SPECIFICATION forming part of Letters Patent No. 702,355, dated June 10, 1902.

Application filed November 13, 1899. Serial No. 736,809. (No model.)

*To all whom it may concern:*

Be it known that we, DAVID BOORMAN and ALBERT P. SHARP, residents of Altoona, in the county of Blair and State of Pennsylvania, have invented certain new and useful Improvements in Washing-Machines; and we do hereby declare the following to be a full, clear, and exact description of the invention, such as will enable others skilled in the art to which it appertains to make and use the same.

Our invention relates to an improvement in washing-machines and means for operating the same, the object of the invention being to so construct a machine that water from an ordinary reservoir-supply, such as is used in cities, may be utilized as motive power to operate the same to effectually wash clothes or other articles placed therein.

A further object is to provide a washing-machine that will be entirely automatic in its action and one that will be comparatively simple in construction, neat in appearance, and most effectual when in use.

With these objects in view the invention consists in certain novel features of construction and combinations and arrangements of parts, as will be more fully hereinafter described, and pointed out in the claims.

In the accompanying drawings, Figure 1 is a view illustrating our improvements. Fig. 2 is an end view, and Figs. 3, 4, 5, 6, and 7 are views of details.

A represents a rectangular casing provided with suitable legs or supports 1. A grating 2 is provided in one end of the casing and a plunger 3 in the other end of said casing, said plunger having perforations therein to permit the water in the casing to pass therethrough. A piston-rod 4 is secured to said plunger 3 and is mounted in a suitable stuffing-box 5 in the end of the casing and is provided on its outer end with a piston 6, mounted in a cylinder 7, secured at one end to the end of the casing A. The cylinder 7 is provided at each end with an inlet-pipe *a*, both of which communicate with a four-way valve-chamber 8, having a valve 9 therein. The inlet-port 10 of said valve-chamber is adapted to be connected with any approved water-supply by a flexible hose or pipe 11. The chamber is also provided with an exhaust-port 12, and the valve 9 is provided with an arbor 12$^a$, projecting through one side of the casing and on which is secured a plate 14, and a lever 15 is loosely mounted on the arbor 13 and is provided between its ends with a stop 16 to engage depressions 17 in the plate and operate the valve. The lever 15 is provided on its upper end with a weight 18, and an operating-rod 19, secured to the plunger 3, projects through the end of the casing and is supported on a roller 20, loosely mounted on the arbor 13. The rod 19 is provided at two points between its ends with adjustable lugs 21, adapted to engage the lever 15 and throw the same from side to side, and hence operate the valve, as will now be described.

The clothes are first placed in the casing A, which can be readily done by simply raising the top 22, and a sufficient amount of hot water poured on the clothes. The flexible tube 11 is now connected with a suitable water-supply and the water turned on. The water will enter one end of the cylinder and drive the piston 6 and plunger 3 in one direction, thus moving the rod 19 into engagement with the lever 15, and it will be seen that when a lug 21 on the rod pulls the lever slightly past a vertical position the weight 18 will compel the lever to fall with sufficient force to strike the plate 14 and turn the valve 9 to its reverse position, thus permitting the water to force the piston and plunger in the opposite direction and also permit the escape of the water in front of the piston, as will readily be understood.

Instead of employing water as a motive power we may employ air, and the apparatus as described with but slight variation will be equally effective with air as water.

Various slight changes might be resorted to in the general form and arrangement of the several parts described without departing from the spirit and scope of our invention, and hence we would have it understood that we do not wish to limit ourselves to the precise details set forth, but consider ourselves at liberty to make such slight changes and alterations as fairly fall within the spirit and scope of our invention.

Having fully described our invention, what we claim as new, and desire to secure by Letters Patent, is—

1. In a washing apparatus, the combination with a clothes-receptacle, a plunger disposed therein and a plunger-rod projecting through one end of the clothes-receptacle, of a cylinder secured to one end of the clothes-receptacle and into which plunger-rod projects, a piston secured to the plunger-rod within said cylinder, inlet-pipes communicating with the respective ends of said cylinder, a valve for controlling the alternate entrance and exhaust of motive fluid through said pipes and means connected with and actuated by the movements of the plunger in the clothes-receptacle for operating said valve, substantially as set forth.

2. In a washing apparatus, the combination with a clothes-receptacle, a plunger therein and a plunger-rod projecting through one end of the clothes-receptacle, of a cylinder secured to one end of the receptacle and into which said plunger-rod projects, a piston in the cylinder and secured to the plunger-rod, a valve-casing having four ports, supply-pipes connecting two of said ports with the respective ends of the cylinder and the other two ports constituting inlet and exhaust ports respectively, a valve in said casing to connect the respective supply-ports alternately with the inlet-port and exhaust-port, a plate or arm secured to the stem of the valve, a weighted arm mounted loosely on said stem and having a part to engage said plate or arm alternately at respective sides of its center, a rod connected to and movable with the plunger in the clothes-receptacle, and adjustable lugs on said rod to throw the weighted arm and effect the shifting of the valve as said plunger moves from end to end of its throw.

In testimony whereof we have signed this specification in the presence of two subscribing witnesses.

DAVID BOORMAN.
ALBERT P. SHARP.

Witnesses:
F. C. GERHARDT,
M. T. NEYLON.